PIEZOELECTRIC COUPLING UNIT

Filed April 19, 1960 3 Sheets-Sheet 1

INVENTOR.
RAYMOND E. WOOD
BY
Mason, Kolehmainen, Rathburn and Wyss
ATTORNEYS.

PIEZOELECTRIC COUPLING UNIT

Filed April 19, 1960 3 Sheets-Sheet 2

INVENTOR.
RAYMOND E. WOOD
BY
Mason, Kolehmainen, Rathburn and Wyss.
ATTORNEYS.

PIEZOELECTRIC COUPLING UNIT

Filed April 19, 1960 3 Sheets-Sheet 3

INVENTOR.
RAYMOND E. WOOD
BY
Mason, Kolehmainen, Rathburn and Wyss
ATTORNEYS.

United States Patent Office 3,209,273
Patented Sept. 28, 1965

3,209,273
PIEZOELECTRIC COUPLING UNIT

Raymond E. Wood, Palatine, Ill., assignor to Radio Industries, Inc., Chicago, Ill., a corporation of Illinois Filed Apr. 19, 1960, Ser. No. 23,275
5 Claims. (Cl. 330—21)

This invention relates to ceramic piezoelectric bodies, and, more particularly, to means for mounting and utilizing these bodies.

United States Patents Nos. 2,708,244 and 2,849,404 describe ceramic piezoelectric transducers formed of lead zirconate-lead titanate and lead titanate-lead stannate with either lead zirconate or lead hafnate. These ceramic bodies have stable operating characteristics, such as frequency selectivity, over a fairly wide range of temperatures and can be economically produced from available raw material. These characteristics, as well as that of being small in physical size, adapt these ceramic bodies for use as filter or coupling units in wave signal receivers, such as the IF sections thereof. When a ceramic body is used as an IF coupling unit, the unit can be smaller in size and more economically produced than the corresponding transformer type of coupling units. Further, since the ceramic body is a fixed frequency device, the time normally consumed in tuning or adjusting a transformer type IF coupling unit is obviated.

In one type of IF coupling unit, a ceramic piezoelectric disc provided with a common electrode on one face and a pair of differential area electrodes on the other face is formed so that the first overtone frequency of the disc corresponds to a selected IF frequency, such as 455 kilocycles. This coupling unit is particularly useful for coupling transistorized amplifier stages which possess a low base impedance in the general range between 300 and 2000 ohms. However, the ceramic coupling unit is basically a capacitive device so that it is necessary to shunt feed the collector of the driving transistor. Thus, the use of these devices as coupling units often presents some problems in realizing an optimum gain in the amplifier stage while maintaining circuit losses below a desired level and insuring stability of operation.

Accordingly, one object of the present invention is to provide a new and improved coupling or filter unit.

A further object is to provide new and improved means for mounting a ceramic piezoelectric body in a coupling unit.

Another object is to provide a coupling unit in which the input capacitance of a ceramic piezoelectric body is tuned by the use of inductive means.

Another object is to provide an amplifier circuit in which the collector electrode of a transistor for driving a ceramic piezoelectric body is energized through an inductor whose inductance bears a desired relation to the input capacitance of the ceramic body.

A further object is to provide a coupling unit including new and improved means for mounting a ceramic piezoelectric body and an inductor on a supporting base.

A further object is to provide an amplifier circuit in which a first ceramic piezoelectric body operating at its first overtone frequency and a second piezoelectric body operating at its fundamental frequency are interposed between successive stages of the amplifier to provide frequency selection.

In accordance with these and many other objects, an embodiment of the invention comprises a unit including a ceramic piezoelectric body for coupling the collector or output electrode of a first transistor to the input or base electrode of a second transistor. The ceramic body is preferably formed as a disc having a common electrode on one surface thereof and a pair of differential area electrodes on the other surface. The larger of the two differential electrodes is connected to the base electrode of the second transistor and the smaller area electrode is connected to the collector or output electrode of the first transistor, the common electrode being connected to a source of reference potential, such as ground. The collector of the first transistor is connected to a source of energizing potential through an inductor having a value in millihenries in the range of $$2 \text{ to } 8\left(\frac{10^{13}}{f^2C}\right)$$

where $f$ is the signal frequency in kilocycles and C is the input capacitance of the ceramic body expressed in micromicrofarads. This inductor provides a choke feed for the collector of the first transistor and tunes the input capacitance of the ceramic body. Although the ceramic body can be formed so that the fundamental frequency of the ceramic body coincides with the signal to be coupled, it is preferable to form the body so that the first overtone frequency of the body corresponds to the signal to be coupled.

To provide a compact and small coupling unit capable of utilizing the ceramic piezoelectric disc, a generally flat base member is provided on which a plurality of electrically conductive terminals are mounted. The ceramic disc is mounted on edge so as to extend diagonally across the generally rectangular base member, and the disc is secured in this position by connecting various of the terminals on the base member to the metallic electrodes on the disc. Thus, the ceramic disc effectively divides the base member into two portions. A generally cylindrical inductor for tuning the input capacitance of the disc is mounted on one of the portions of the base with its axis extending generally perpendicular to the base. The leads of the inductor are connected to a pair of the terminals carried on the base member.

In a second embodiment of the invention in which the frequency selectivity of the coupling means between the first and second transistors is improved, a second ceramic piezoelectric body, preferably in the form of a disc having conductive electrodes on its opposite faces, is provided. One of the electrodes on the second ceramic disc is connected to the greater area or output electrode of the first ceramic body, the input capacitance of which is also tuned by an inductor, and the second electrode on the second ceramic disc is connected to the base electrode of the second transistor. The fundamental frequency of the second ceramic body is selected to correspond to the signal that is to be coupled between the first and second transistors. Since the second ceramic disc operates at its fundamental frequency, the size of this second ceramic disc is smaller than the first ceramic disc, and it can be mounted on edge on the second half of the base member so as to extend generally diagonally thereacross parallel to the first disc.

In a third embodiment of the invention which also provides improved frequency selectivity, the coupling means between the first and second transistors comprises a pair of ceramic devices, both of which are formed so that their first overtone frequency coincides with the signal frequency. The smaller area input electrode of the first ceramic disc is connected to the collector electrode of the first transistor, and the input capacitance of the first disc is again tuned by an inductor having a value of inductance in the range set forth above. The larger area or output electrode on the first disc is connected to the input electrode of the second ceramic body, and the output electrode of the second ceramic body or disc is connected to the base electrode of the second transistor. These two discs are again mounted on edge on the base member.

Many other objects and advantages of the present invention will become apparent from the following detailed description when considered in conjunction with the drawings, in which.

Figure 5:
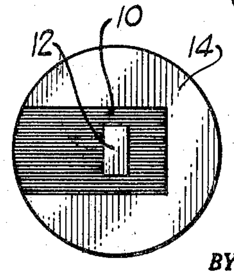
FIG. 5 is a plan view of a ceramic piezoelectric body used in the coupling unit of the present invention.

In general, the present invention is concerned with the use of ceramic piezoelectric bodies of the type described in detail in the above identified United States patents. FIG. 5 of the drawings illustrates a piezoelectric body or disc 10 having a lower surface or face that is provided with an electrically conductive electrode 15 (FIGS. 2 and 3) and an opposite surface or face that is provided with an electrically conductive input electrode 12 and an electrically conductive output electrode 14. The electrodes 12 and 14 are differential in area so that the input electrode 12 is of a smaller area than the output electrode 14. If, for example, the ceramic disc 10 is to be used in an IF section of a wave signal receiver, the fundamental frequency at which the disc 10 is resonant can be chosen so that its first overtone frequency has the value of 455 kilocycles which is a common IF frequency. The input capacitance of the disc 10 measured between the input electrode 12 and a reference point falls within the range of 25 to 500 $\mu\mu$fd.

Figure 1:
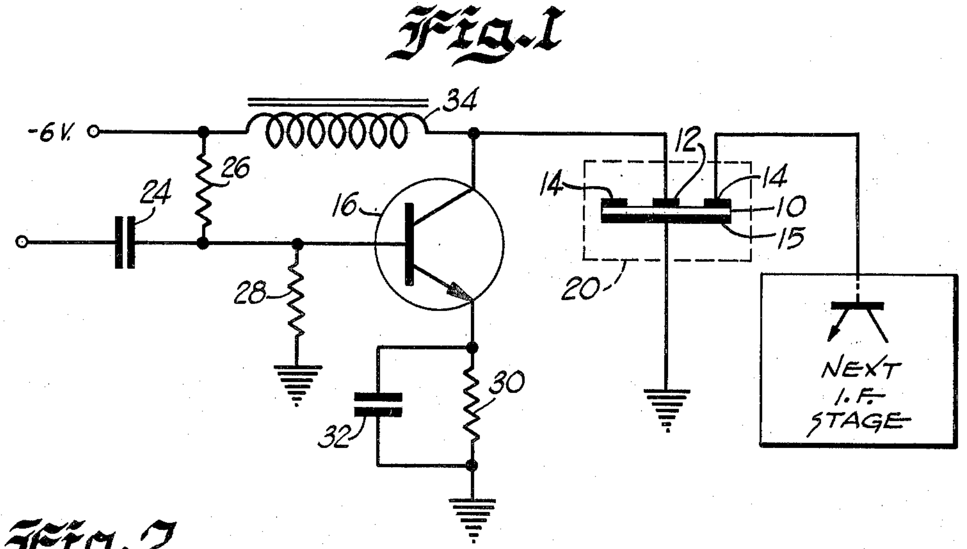
FIG. 1 is a circuit diagram of a first embodiment of the invention.

One means for utilizing the frequency selective characteristic of the ceramic piezoelectric body or disc 10 is as a coupling unit in the IF section of a wave signal receiver. In FIG. 1, there is illustrated a first amplifier section including a transistor 16 that is coupled to a subsequent IF stage 18 by a coupling unit 20. The coupling unit 20 includes the ceramic piezoelectric disc 10 which can be formed so that its first overtone frequency corresponds to the 455 kilocycle signal used in the IF section of the receiver. The output electrode 14 of the disc 10 is connected to the base or input electrode of the transistor forming the next IF stage 18, and the input or smaller electrode 12 is directly connected to the collector electrode of the transistor 16. The common electrode 15 on the disc 10 is connected to ground or a source of reference potential.

The amplifier stage provided by the transistor 16 is provided with an input signal through a coupling capacitor 24 that is connected to the base electrode of the transistor 16, this electrode being provided with a biasing potential by a pair of resistors 26 and 28 that are connected between ground and a fixed negative potential source. The emitter of the transistor 16 is connected to ground by an emitter resistor 30 and a bypass capacitor 32. The transistor 16 amplifies the input signals, and the amplified signals of the selected 455 kilocycle frequency are coupled through the unit 20 to the input of the IF stage 18.

In utilizing the ceramic piezoelectric body or disc 10 as the coupling element between the transistor 16 and the transistor forming the stage 18, it is desirable to obtain as large a gain from the stage without unduly increasing circuit losses or introducing circuit instability, such as frequency drift. To accomplish this, the collector of the transistor 16 is supplied with an energizing potential through an inductor 34 whose inductance bears a desired relationship to the input capacitance of the ceramic piezoelectric disc 10 at the signal frequency. The value of the inductance of the inductor 34 in millihenries should be in the range of $$2 \text{ to } 8\left(\frac{10^{13}}{f^2C}\right)$$

where $f$ is the signal frequency in kilocycles and C is the input capacitance of the disc 10 expressed in micromicrofarads. Within this range, the preferred value of the inductance is $$3\left(\frac{10^{13}}{f^2C}\right)$$

As set forth above, the input capacitance of the disc 10 is between 25 and 500 $\mu\mu$fd. Thus, the inductor 34, which is connected between the collector of the transistor 16 and the source of negative potential, is adjusted to have a proper value within the general range between 15 and .2 millihenries, respectively, for a signal frequency of 455 kilocycles. By the use of an inductive load for the collector of the transistor 16 that has a value of inductance that tunes that input capacitance of the ceramic piezoelectric disc 10 to the desired degree, the gain of the amplifier stage provided by the transistor 16 is maintained at a high level and excessive losses in the circuit and the instability thereof are avoided.

In one illustrative amplifier circuit that was constructed in accordance with the present invention, the components shown in FIG. 1 had the following values. It is obvious however, that these components can have values other than those listed below in dependence on the desired design parameters:

| | |
|---|---|
| Transistor 16 | Philco type 5420. |
| Capacitor 24 | .1 $\mu$fd. |
| Resistor 26 | 10K. |
| Resistor 28 | 10K. |
| Resistor 30 | 1K. |
| Capacitor 32 | .1 $\mu$fd. |
| Inductor 34 | 1.4–5.5 mh. |

With the components listed above, the coupling unit 20 includes a ceramic piezoelectric body or disc 10 having an input capacitance of 70 $\mu\mu$fd., and the body 10 is formed so that its first overtone frequency is 455 kilocycles. With these circuit values, the preferred inductance value of the inductor 34 is around 2 mh.

Figure 2:
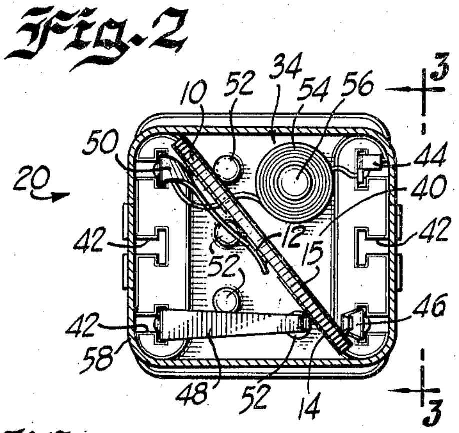
FIG. 2 is a top plan view in partial section of a coupling unit used in the circuit shown in FIG. 1.
Figure 3:
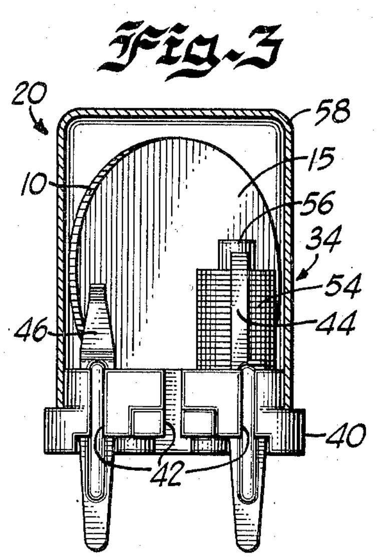
FIG. 3 is an end elevational view taken in the direction of line 3—3 in FIG. 2 with the cover broken away.
Figure 4:
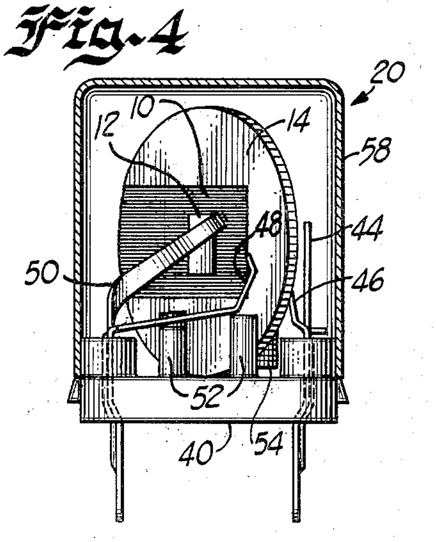
FIG. 4 is a front elevational view of the unit illustrated in FIG. 2 with the cover broken away.

The novel mechanical construction of the coupling unit 20 is illustrated in FIGS. 2–4 of the drawings. The coupling unit 20 includes a dielectric base plate 40 having three T-shaped slots 42 formed in two opposite edges thereof. Four terminal pins 44, 46, 48 and 50 are mounted in the slots 42 with their lower ends projecting below the lower surface of the base 40 to provide a means for interconnecting the coupling unit 20 with an external circuit. To provide a means for supporting the disc 10 on the base member 40, the upper surface of this base is provided with a plurality of upwardly extending projections 52 between some of which the ceramic piezoelectric disc 10 is inserted in an edgewise fashion so that the disc 10 extends generally diagonally across the base 40 between the terminal pins 46 and 50. To secure the disc 10 in this position, the upper end of the terminal pin 50 is offset towards the disc 10 to resiliently engage the input electrode 12. Similarly, the elongated upper end of the terminal pin 48 is offset to resiliently engage the output electrode 14. The upper end of the terminal pin 46 is offset to engage the common electrode 15. Thus, the mechanical engagement of the electrodes 15, 14 and 12 by the terminals 46, 48 and 50 positively locates the ceramic piezoelectric disc 10 in the position on the base 40 determined by the locating and guiding projections 52.

The coupling unit 20 also includes the inductor 34. This inductor comprises a coil 54 that is wound around a high permeability magnetic core 56 formed, for instance, of ferrite. The lower end of the core 56 is received within a cylindrical boss formed in the upper surface of the base 40 that is located in one of the two portions into which the base is divided by the disc 10. The lead to the coil 54 of the inductor 34 that is adapted to be connected to the voltage source is connected to the terminal pin 44, and the other lead of the winding 54 is connected to the terminal pin 50 to which the input electrode 12 of the ceramic disc 10 is connected. The core 56 is so mounted on the base 40 as to extend substantially perpendicular thereto and generally parallel to the plane of the disc 10. The disc 10 and the inductor 34 are enclosed by a suitable housing or cover element 58 that is detachably mounted on the base member 40.

Figure 6:
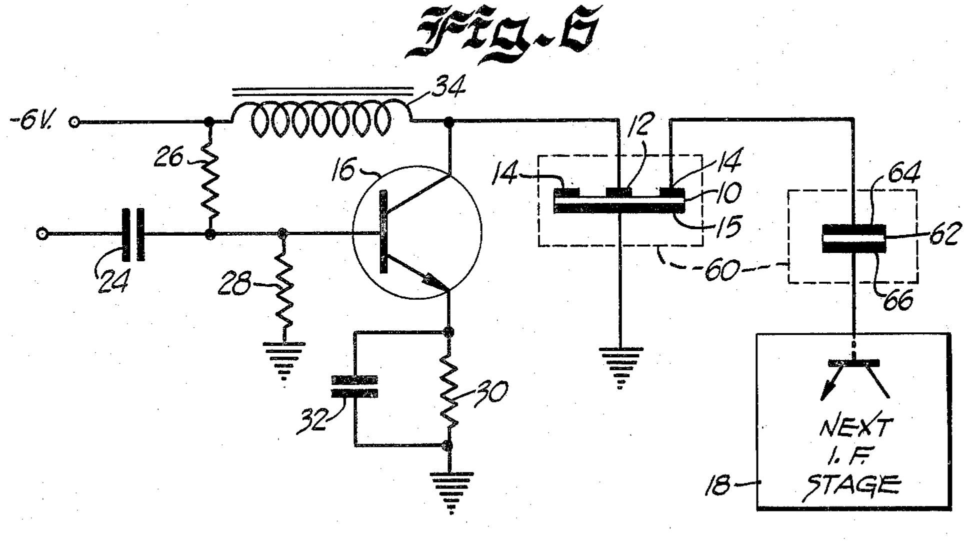
FIG. 6 is a circuit diagram of a second embodiment of the invention.

FIG. 6 of the drawings illustrates a second embodiment of the invention in which the amplifier stage including the transistor 16 is coupled to the subsequent stage 18 of the IF section of the wave signal receiver by a coupling unit 60. The unit 60 includes not only the ceramic piezoelectric body or disc 10 having a first overtone frequency of 455 kilocycles, but also a second ceramic piezoelectric body or disc 62 whose fundamental frequency is 455 kilocycles. The ceramic body 62 is provided with a pair of electrically conductive or metallic electrodes 64 and 66 on its opposite faces or surfaces. The electrode 64 is connected to the output electrode 14 of the ceramic disc 10, and the electrode 66 is coupled to the base electrode of the transistor in the IF stage 18. Thus, the coupling unit 60 provides an additional degree of frequency selectivity by the inclusion of the two ceramic bodies 10 and 62 having first overtone and fundamental frequencies, respectively, corresponding to the signal frequency of the IF section. The circuitry associated with the transistor 16 is identical to that shown in FIG. 1 and includes the inductor 34 for resonating the input capacitance of the disc 10.

Figure 7:
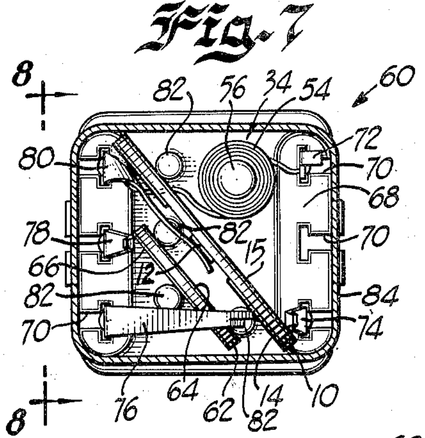
FIG. 7 is a top plan view in partial section of a coupling unit used in the circuit illustrated in FIG. 6.
Figure 8:
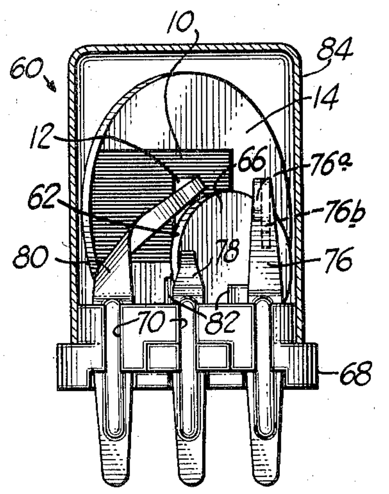
FIG. 8 is a side elevational view taken in the direction of line 8—8 in FIG. 7 with the cover broken away.
Figure 9:
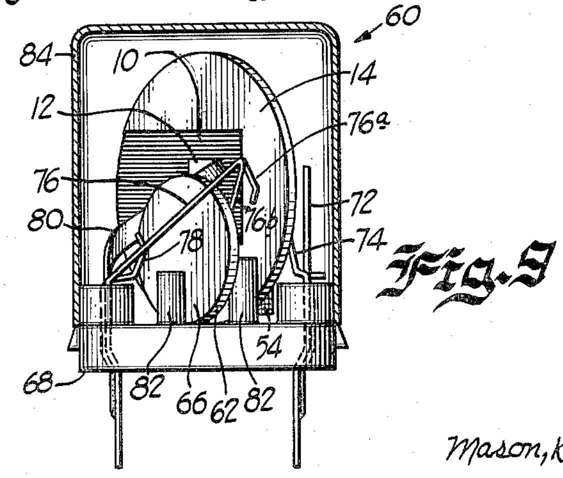
FIG. 9 is a front elevational view of the unit shown in FIG. 7 wth the cover broken away.

FIGS. 7–9 of the drawings illustrate the mechanical details of the coupling unit 60. This unit includes a generally flat and rectangular dielectric base member 68 having a plurality of T-shaped slots 70 formed in two opposite edges thereof for receiving five terminal pins 72, 74, 76, 78 and 80. The disc 10 is again mounted on edge in a position extending generally diagonally across the base member 68 by the use of a plurality of guiding and locating projections 82 that extend upwardly from the upper surface of the base member 68. The disc 10 is secured on the base member 68 by the terminals 74 and 80 which engage the electrodes 12 and 15 in the same manner as the terminals 46 and 50 which secure the disc 10 on the base member 40. In addition, the inductor 34 is mounted on the base member 68 in the same manner as in the coupling unit 20 with the leads to the coil 54 being connected to the terminals 72 and 80.

The disc 62 is mounted on the other half of the upper surface of the base 64 opposite to the inductor 34 by mounting the ceramic disc 62 on edge between a plurality of the projections 82. The upper end of the terminal 78 is offset into resilient engagement with the electrode 66. The terminal 76 is provided with two angularly offset end portions **76*a* and 76*b*. The portion 76*a* engages the electrode 14, and the portion 76*b* engages the electrode 64. Thus, these two portions of the terminal pin 76 interconnect the electrodes 14 and 64 on the ceramic discs 10 and 62 in the coupling unit 60. Although the circuit illustrated in FIG. 6 does not require an external connection to the electrodes 14 and 64, the terminal pin 76 provides a means for making this connection if it is desired. The discs 10 and 62 and the inductor 34 are enclosed by a housing 84 that is detachably mounted on the base member 68**.

By mounting the ceramic discs 10 and 62 in side-by-side edgewise relationship on the base member 68, the physical space required by the coupling unit 60 is maintained at a minimum, and the mechanical and electrical connections to these discs can be easily made. It is possible to mount both of the ceramic discs 10 and 62 on the base member 68, which is the same as the base member 40, because the fundamental frequency of the disc 62 corresponds to the signal frequency of the IF section rather than the first overtone frequency used with the ceramic piezoelectric body 10.

Figures 10, 11, 12, 13:
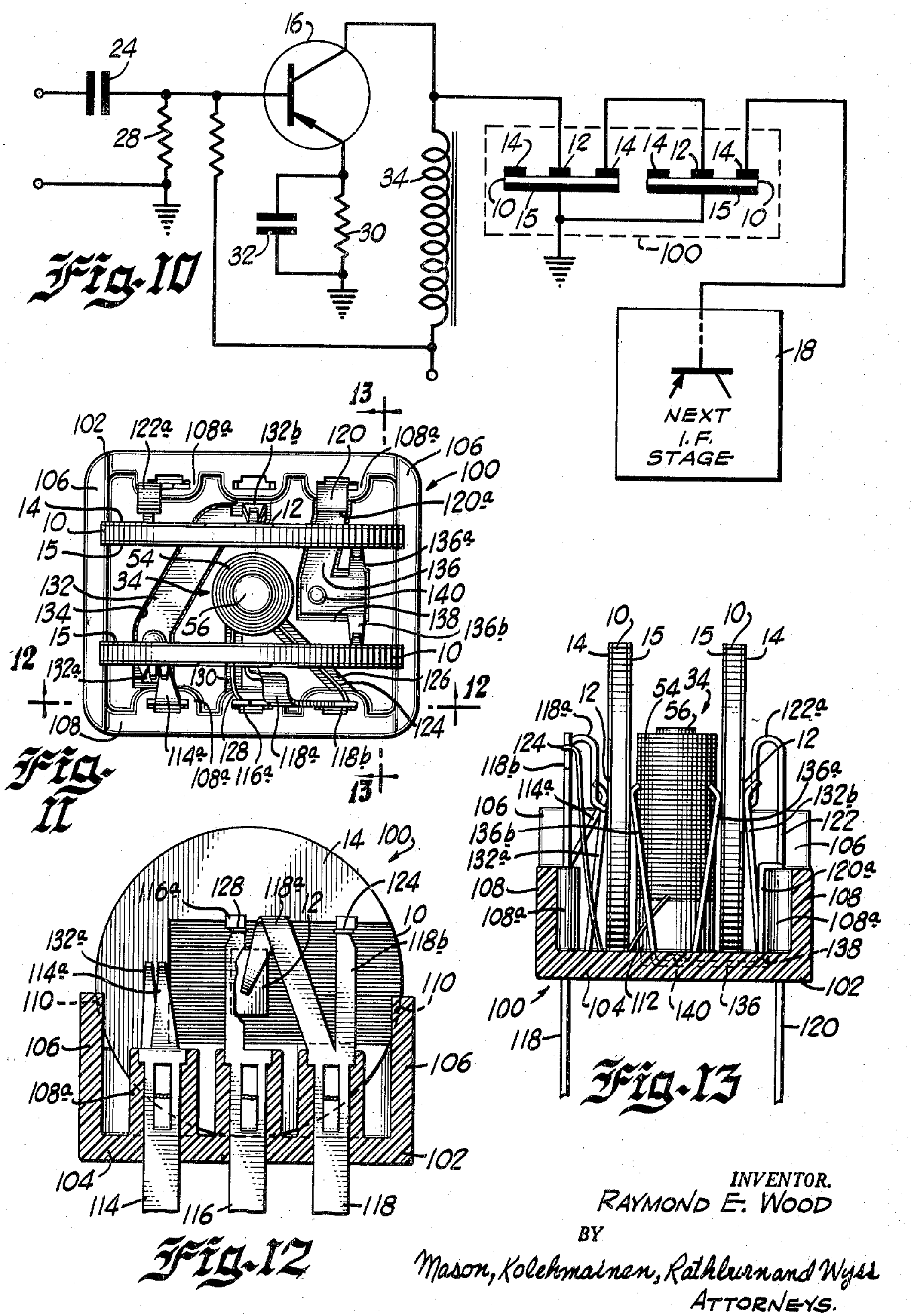
FIG. 10 is a circuit diagram of a third embodiment of the invention.
FIG. 11 is a top plan view of a coupling unit used in the circuit shown in FIG. 10.
FIG. 12 is a sectional view taken along line 12—12 in FIG. 11.
FIG. 13 is a sectional view taken along line 13—13 in FIG. 12.

FIG. 10 of the drawings illustrates a third embodiment of the invention in which the amplifier stage including the transistor 16 is coupled to the subsequent stage 18 of the IF section of the wave signal receiver by a coupling unit 100. The unit 100 includes a pair of ceramic piezoelectric bodies or discs 10 having a first overtone frequency of 455 kilocycles corresponding to the frequency of the signal to be coupled between the amplifier stages. Both of the bodies 10 are identical to the ceramic disc shown in FIG. 5 of the drawings. The collector of the transistor 16 is connected to the input electrode 12 of the first disc 10, and the output electrode 14 of this disc is connected to the input electrode 12 of the second ceramic body 10. The output electrode 14 of this second body is connected to the input of the next IF stage 18. The inclusion in the coupling unit 100 of the two ceramic bodies 10 provides an additional degree of frequency selectivity, particularly in the "skirts" of the bandpass characteristic.

The physical construction of the coupling unit 100 is illustrated in FIGS. 11–13. As shown therein, the unit 100 includes a dielectric base member 102 having a bottom wall 104, a first pair of opposite side walls 106, and a second pair of opposite side walls 108. The two ceramic bodies or discs 10 are placed on edge in the housing 102 engaging the bottom wall 104 and extending generally parallel to each other and to the walls 108. The upper ends of the walls 106 are provided with two pairs of spaced notches or slots 110 for receiving the edges of the disc 10 to aid in positioning these discs. The two discs 10 are mounted on the housing or base member 102 with the electrodes 15 facing inwardly toward each other and with the electrodes 12 and 14 facing outwardly toward the side walls 108. A boss 112 (FIGS. 13) formed in the lower wall 104 supports the winding 54 and the core 56 of the inductor 34 substantially centrally between the two discs 10.

To provide means for securing the discs 10 on the housing 102 and for extending electrical connections to the inductor 34 and the electrodes on the ceramic body 10, five resilient terminals 114, 116, 118, 120 and 122 are provided. Each of these terminals includes both an intermediate portion secured within a rounded projection **108*a* in the walls 108 and a lower portion extending below the lower surface of the lower wall 104 to provide means for extending the connections to the external circuits. The terminal 118 is adapted to be connected to the collector of the transistor 16 and includes an offset upper portion 118*a* that engages the input electrode 12** on the first ceramic body 10. A conductor 124 disposed in a groove 126 in the upper surface of the lower wall 104 connects the terminal 118 to the inductor 34. The other lead to the coil 34 is connected to the terminal 116 by a conductor 128 that extends beneath the lower edge of the left-hand disc (FIG. 13) through a groove 130 (FIG. 11).

An angularly offset, upper portion 114*a* of the terminal 114 engages the output electrode 14 on the first disc 10 so that an output can be derived directly from the first ceramic piezoelectric body 10 in the coupling unit 100. This electrode 14 is connected to the input electrode 12 of the second ceramic disc 10 by a somewhat U-shaped and resilient, electrically conductive segment 132 that is secured in a groove 134 in the upper surface of the wall 104. The segment 132 includes both a first upwardly extending end portion 132*a* that engages the output electrode 14 on the first disc 10 and a second upwardly extending portion 132*b* that bears against the input electrode 12 of the second disc 10. An offset upper portion 122*a* on the terminal 122 engages the electrode 14 on the second disc 10 to provide a means for connecting the output of the coupling unit 100 to the input of the next stage 18.

To provide means for connecting the electrodes 15 to ground, the terminal 120 is bent over and connected to a metal segment 136 (FIG. 13) that is secured within a groove 138 (FIG. 11) in the lower wall 104 by a fastening means 140. One end of the segment 136 includes a pair of resilient and angularly offset arms 136*a* and 136*b* which individually bear against the electrodes 15 on the two ceramic bodies 10.

Although the present invention has been described with reference to three illustrative embodiments thereof, it should be understood that other modifications and embodiments can be made by those skilled in the art which will fall within the spirit and scope of the principles of this invention.

What is claimed and desired to be secured by Letters Patent of the United States is:

1. An amplifier circuit comprising a first transistor including emitter, base, and collector electrodes; means for supplying a signal input to the base electrode of the first transistor; a second transistor including emitter, base, and collector electrodes; coupling means including at least one ceramic piezoelectric body adapted to pass signals of a given frequency $f$ and including both an output electrode and an input electrode possessing a given input capacitance C; means connecting said input electrode to the collector electrode of the first transistor; means coupling the output electrode to the base electrode of the second transistor; a source of operating potential for the first transistor connected across the collector-emitter circuit thereof; and inductive means connected between said source and the collector electrode of the first transistor and having a value of inductance expressed in millihenries which falls within the range of $$2 \text{ to } 8\left(\frac{10^{13}}{f^2C}\right)$$

where $f$ is expressed in kilocycles and C is expressed in micro-microfarads.

2. An amplifier comprising a first amplifier stage including an input means and an output means, means for supplying a signal input to the input means of the first amplifier stage, a second amplifier stage including an input means, coupling means including at least one ceramic piezoelectric disc adapted to pass signals of a given frequency $f$, a first electrode carried on one face of said disc and connected to the input means for the second amplifier stage, a second electrode carried on said one face of said disc and of lesser area than said first electrode, means connecting said second electrode to the output means for the first amplifier stage, said disc and said second electrode presenting a given input capacitance C to the output means of the first amplifier stage, a source of potential for energizing said first amplifier stage, and an inductor connected between said output means and said source and having a value of inductance expressed in millihenries that falls within the range of $$2 \text{ to } 8\left(\frac{10^{13}}{f^2C}\right)$$

where $f$ is expressed in kilocycles and C is expressed in micro-microfarads.

3. An amplifier circuit comprising a first controlled conduction device having an output electrode, a second controlled conduction device having an input electrode, a first piezoelectric ceramic body having a surface on which are carried a first electrode and a second electrode of greater area than and spaced from said first electrode, said first electrode having an input capacitance C, said first ceramic body being formed with a frequency selection characteristic in which its first overtone frequency $f$ coincides with the frequency of the signal to be coupled between said first and second controlled conduction devices, means connecting said first electrode to said output electrode, a potential source for energizing the first controlled conduction device, said means for connecting the first electrode to the output electrode having an inductive means connected between the potential source and the point of common connection between the output electrode of the first controlled conduction device and the first electrode, said inductive means having an inductance in millihenries that falls within the range of $$2\text{–}8\left(\frac{10^{13}}{f^2C}\right)$$

where $f$ is expressed in kilocycles and C is expressed in micro-microfarads, a second piezoelectric ceramic body having third and fourth electrodes on opposite sides thereof, said second ceramic body having a frequency selection characteristic in which the fundamental frequency of the second ceramic body coincides with the frequency $f$ of the signal to be coupled between the first and second controlled conduction devices, and means coupling said third electrode to said second electrode and said fourth electrode to said input electrode.

4. An amplifier circuit comprising an amplifier stage having an output means and an input means, means for supplying a signal input to the input means of the amplifier stage, signal coupling means including at least one ceramic body adapted to pass a signal of a given frequency $f$ and including input and output electrodes of differential area, said input electrode of said ceramic body having an input capacitance C and being connected to the output means of the amplifier stage, a load circuit connected to the output electrode of said ceramic body, a potential source for energizing the amplifier stage, and an inductor connected to between the potential source and the input electrode of said ceramic body, said inductor having an inductance in millihenries that falls within the range of $$2 \text{ to } 8\left(\frac{10^{13}}{f^2C}\right)$$

where $f$ is expressed in kilocycles and C is expressed in micro-microfarads.

5. The amplifier circuit set forth in claim 4, in which the load circuit includes an additional controlled conduction means having an input electrode, an additional ceramic element mechanically resonant at said frequency $f$ and including input and output electrodes of differential area, first circuit means connecting the output electrode of said first ceramic body to the input electrode of said additional ceramic element, and second circuit means connecting the output electrode of said additional ceramic element to the input electrode of said additional controlled conduction means.

(References on following page)

References Cited by the Examiner

UNITED STATES PATENTS

| | | | |
|---|---|---|---|
| 2,240,293 | 4/41 | Goddard | 330—174 X |
| 2,605,354 | 7/52 | Burns, et al. | 330—174 X |
| 2,867,780 | 1/59 | Potter | 333—72 |
| 2,936,424 | 5/60 | Steggerda | 330—21 |
| 2,937,340 | 5/60 | Holmes | 330—21 |
| 2,943,279 | 6/60 | Mattiat | 333—72 |

FOREIGN PATENTS

| | | |
|---|---|---|
| 848,946 | 9/60 | Great Britain. |
| 1,192,081 | 4/59 | France. |

ROY LAKE, *Primary Examiner.*

ELI J. SAX, ARTHUR GAUSS, *Examiners.*

UNITED STATES PATENT OFFICE

CERTIFICATE OF CORRECTION

Patent No. 3,209,273 September 28, 1965

Raymond E. Wood

It is hereby certified that error appears in the above numbered patent requiring correction and that the said Letters Patent should read as corrected below.

Column 8, line 20, strike out "f", in italics, and insert the same after "frequency", same line 20; line 55, strike out "to".

Signed and sealed this 28th day of June 1966.

(SEAL)
Attest:

ERNEST W. SWIDER
Attesting Officer

EDWARD J. BRENNER
Commissioner of Patents